United States Patent
Nakazawa

(10) Patent No.: US 12,381,775 B2
(45) Date of Patent: Aug. 5, 2025

(54) DEVICE MANAGEMENT APPARATUS, CONTROL METHOD, AND NONTRANSITORY COMPUTER-READABLE STORAGE MEDIUM

(71) Applicant: CANON KABUSHIKI KAISHA, Tokyo (JP)

(72) Inventor: Toshiyuki Nakazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/538,944

(22) Filed: Nov. 30, 2021

(65) Prior Publication Data

US 2022/0182282 A1    Jun. 9, 2022

(30) Foreign Application Priority Data

Dec. 3, 2020    (JP) .................................. 2020-200942

(51) Int. Cl.
*H04L 41/08*    (2022.01)
*H04L 67/02*    (2022.01)

(52) U.S. Cl.
CPC .............. *H04L 41/08* (2013.01); *H04L 67/02* (2013.01)

(58) Field of Classification Search
CPC ......... G06F 2221/2113; G06F 21/6218; H04L 63/107; H04L 63/10; H04L 63/126; H04L 67/52; H04L 67/10; H04L 67/107; H04L 41/08; H04L 67/02; H04L 67/51; H04L 41/22; H04L 43/028; H04L 41/0806; H04L 41/0893; H04L 41/046

See application file for complete search history.

(56) References Cited

U.S. PATENT DOCUMENTS

| | | | | |
|---|---|---|---|---|
| 8,868,905 B2 * | 10/2014 | Davis | .................... | H04L 63/107 |
| | | | | 726/28 |
| 11,317,292 B1 * | 4/2022 | Feldmann | .............. | H04W 12/08 |
| 2003/0061166 A1 * | 3/2003 | Saito | ........................ | G06F 21/88 |
| | | | | 705/54 |
| 2009/0006109 A1 * | 1/2009 | Martinez | .............. | G06Q 50/184 |
| | | | | 705/310 |
| 2012/0159156 A1 * | 6/2012 | Barham | ................ | G06F 21/604 |
| | | | | 726/4 |

(Continued)

FOREIGN PATENT DOCUMENTS

| | | | |
|---|---|---|---|
| JP | 2005322031 A | 11/2005 |
| JP | 2017135467 A | 8/2017 |

(Continued)

OTHER PUBLICATIONS

"IEEE Draft Standard for Local and metropolitan area networks—Port-Based Network Access Control," in IEEE P802.1X/D1.4 Jun. 2019 , vol., No., pp. 1-287, Aug. 8, 2019. (Year: 2019).*

(Continued)

*Primary Examiner* — Messeret F Gebre
(74) *Attorney, Agent, or Firm* — Canon U.S.A., Inc. IP Division

(57) ABSTRACT

A device management application sets an attribute for each of a plurality of regions, sets a region to a user, sets a region to a device and a device group, sets a region to a task defining an operation for a management target device, and controls access of a user to the device, the device group, and the task in accordance with a set region.

8 Claims, 13 Drawing Sheets

(56) References Cited

U.S. PATENT DOCUMENTS

| | | | | |
|---|---|---|---|---|
| 2015/0163373 A1* | 6/2015 | Monden | ............ | H04N 1/32657 |
| | | | | 358/1.14 |
| 2016/0359963 A1* | 12/2016 | Chatley | ................ | G06F 3/0613 |
| 2017/0237820 A1* | 8/2017 | Scarborough | ........... | H04L 67/60 |
| | | | | 709/226 |
| 2018/0060601 A1* | 3/2018 | Kay | ..................... | H04W 12/08 |
| 2021/0288973 A1* | 9/2021 | Dimble | .............. | H04W 12/108 |
| 2022/0392283 A1* | 12/2022 | Charling | .............. | H04W 12/08 |

FOREIGN PATENT DOCUMENTS

| | | | |
|---|---|---|---|
| JP | 2018082329 A | 5/2018 |
| JP | 2019175056 A | 10/2019 |
| JP | 2020100038 A | 7/2020 |
| JP | 2020170379 A | 10/2020 |

OTHER PUBLICATIONS

Han, J., Susilo, W., Mu, Y., & Yan, J. (2012). Attribute-based oblivious access control. Computer Journal, 55(10), 1202-15. (Year: 2012).*

E. Sahafizadeh and S. Parsa, "Survey on access control models," 2010 2nd International Conference on Future Computer and Communication, Wuhan, China, 2010, pp. V1-1-V1-3, doi: 10.1109/ICFCC.2010.5497850. (Year: 2010).*

* cited by examiner

FIG.4A

LIST OF REGIONS

| REGION NAME | UPDATED DATE AND TIME | NUMBER OF DEVICES | |
|---|---|---|---|
| GERMANY | 2020/4/2 | 103 | × |
| FRANCE | 2020/4/1 | 49 | × |
| SPAIN | 2020/5/10 | 67 | × |
| ITALY | 2020/3/14 | 35 | × |

— 401
— 402

CREATE NEW — 403

FIG.4B

REGION SETTING

| | |
|---|---|
| REGION NAME: | PORTUGAL — 410 |
| IP ADDRESS RANGE: | 192.168.10.0 – 192.168.12.255<br>192.168.21.10 – 192.168.22.255<br>192.168.30.12 — 411 |
| BACKWARD MATCH OF FQDN: | .pt — 412 |

SAVE — 413    CANCEL — 414

FIG.6A

DEVICE GROUP SETTING

GROUP NAME: [MFP ON 5TH FLOOR OF HEAD OFFICE] ~601

REGION: [SELECT REGION ▼] ~602

☐ GERMANY  ☑ FRANCE  ☑ SPAIN ~603
☐ ITALY    ☐ PORTUGAL

SELECT DEVICE

| ☐ DEVICE NAME | PRODUCT NAME | ADDRESS | INSTALLATION LOCATION |
|---|---|---|---|
| ☑ HQ5FNE_iRC5000 | iRC 5000 | 172.29.65.102 | HEAD OFFICE 5TH FLOOR NORTH |
| ☐ HQ5FNW_LBP2000 | LBP 2000 | 172.29.65.106 | HEAD OFFICE 5TH FLOOR NORTH |
| ☑ HQ5FSE_iR6000 | iR 6000 | 172.29.65.96 | HEAD OFFICE 5TH FLOOR SOUTH |
| ☐ HQ7FNW_iRC4000 | iR C4000 | 172.29.67.76 | HEAD OFFICE 7TH FLOOR NORTH |

~604

[SAVE] [DELETE] [CANCEL]
  605    606     607

FIG.6B

SELECT DEVICE  610

FILTER: [ADDRESS ▼]  [ADD] ~611

DEVICE NAME: [START WITH DESIGNATED VALUE ▼] [HQ] x ~612

PRODUCT NAME: [INCLUDE DESIGNATED VALUE ▼] [LBP] x ~613

614~ [APPLY] [CLEAR] ~615

| DEVICE NAME | PRODUCT NAME | ADDRESS | INSTALLATION LOCATION |
|---|---|---|---|
| HQ2FSW_LBP2300 | LBP 2300 | 172.29.54.24 | HEAD OFFICE 2ND FLOOR NORTH |
| HQ5FNW_LBP2000 | LBP 2000 | 172.29.65.106 | HEAD OFFICE 5TH FLOOR NORTH |
| HQ9FNE_LBP1500C | LBP 1500C | 172.29.68.201 | HEAD OFFICE 9TH FLOOR NORTH |
| HT12FSE_LBP2050C | LBP 2050C | 172.29.70.94 | HEAD OFFICE 12TH FLOOR SOUTH |

TASK SETTING

TASK TYPE: DELIVERY OF CA CERTIFICATE ~701

TASK NAME: [DELIVERY OF INTRACOMPANY CERTIFICATE] ~702

REGION: [SELECT REGION ▼] ~703

☐ GERMANY ☑ FRANCE ☑ SPAIN ~704
☐ ITALY ☐ PORTUGAL

SCHEDULE: [DESIGNATE DATE AND TIME ▼] ~705

EXECUTION DATE AND TIME: [2021/05/23 10:00 ▼] ~706

CERTIFICATE TO BE DELIVERED

| ☐ | ISSUANCE DESTINATION | SERIAL NUMBER |
|---|---|---|
| ☐ | CN=ABC Inc., O=ABC Inc., C=US | 01 |
| ☑ | CN=DigiSec Inc., O=DigiSec Inc., C=GB | 04 |
| ☐ | CN=GlobalCert, O=GlobalCert, OU=Root CA | 020020B |
| ☐ | CN=Class 3 Public, O=XYZ Coop., C=US | 034242 |

~707

SELECT DEVICE

| ☐ | DEVICE NAME | PRODUCT NAME | ADDRESS | INSTALLATION LOCATION |
|---|---|---|---|---|
| ☐ | HQ5FNE_iRC5000 | iRC 5000 | 172.29.65.102 | HEAD OFFICE 5TH FLOOR NORTH |
| ☐ | HQ5FNW_LBP2000 | LBP 2000 | 172.29.65.106 | HEAD OFFICE 5TH FLOOR NORTH |
| ☑ | HQ5FSE_iR6000 | iR 6000 | 172.29.65.96 | HEAD OFFICE 5TH FLOOR SOUTH |
| ☑ | HQ7FNW_iRC4000 | iR C4000 | 172.29.67.76 | HEAD OFFICE 7TH FLOOR NORTH |

~708

SELECT DEVICE GROUP

| ☐ | GROUP NAME | TYPE |
|---|---|---|
| ☐ | MFP ON 5TH FLOOR OF HEAD OFFICE | DESIGNATED BY CONDITION |
| ☑ | MFP OF SALES DEPARTMENT | INDIVIDUALLY DESIGNATED |
| ☐ | PRINTER EXCLUSIVE TO SUPERVISORY EMPLOYEES | INDIVIDUALLY DESIGNATED |
| ☐ | COLOR HIGH-SPEED DEVICE | DESIGNATED BY CONDITION |

~709

[SAVE] [DELETE] [CANCEL]
  710     711     712

FIG.8

TASK SETTING

| | |
|---|---|
| TASK TYPE: | DELETION OF CA CERTIFICATE ~801 |
| TASK NAME: | [DELETION OF EXPIRED CERTIFICATE] ~802 |
| REGION: | [SELECT REGION ▼] ~803 |
| | ☐ GERMANY  ☑ FRANCE  ☑ SPAIN ~804 |
| | ☐ ITALY  ☐ PORTUGAL |
| SCHEDULE: | [DESIGNATE DATE AND TIME ▼] ~805 |
| EXECUTION DATE AND TIME: | [2021/05/23  10:00  ▼] ~806 |

CERTIFICATE TO BE DELETED

| ☐ | ISSUANCE DESTINATION | EXPIRATION DATE |
|---|---|---|
| ☑ | CN=ABC Inc., O=ABC Inc., C=US | 2019/3/14 |
| ☑ | CN=DigiSec Inc., O=DigiSec Inc., C=GB | 2020/5/31 |
| ☐ | CN=GlobalCert, O=GlobalCert, OU=Root CA | 2030/12/31 |
| ☐ | CN=Class 3 Public, O=XYZ Coop., C=US | 2029/6/30 |

~807

[SAVE] [DELETE] [CANCEL]
 808    809     810

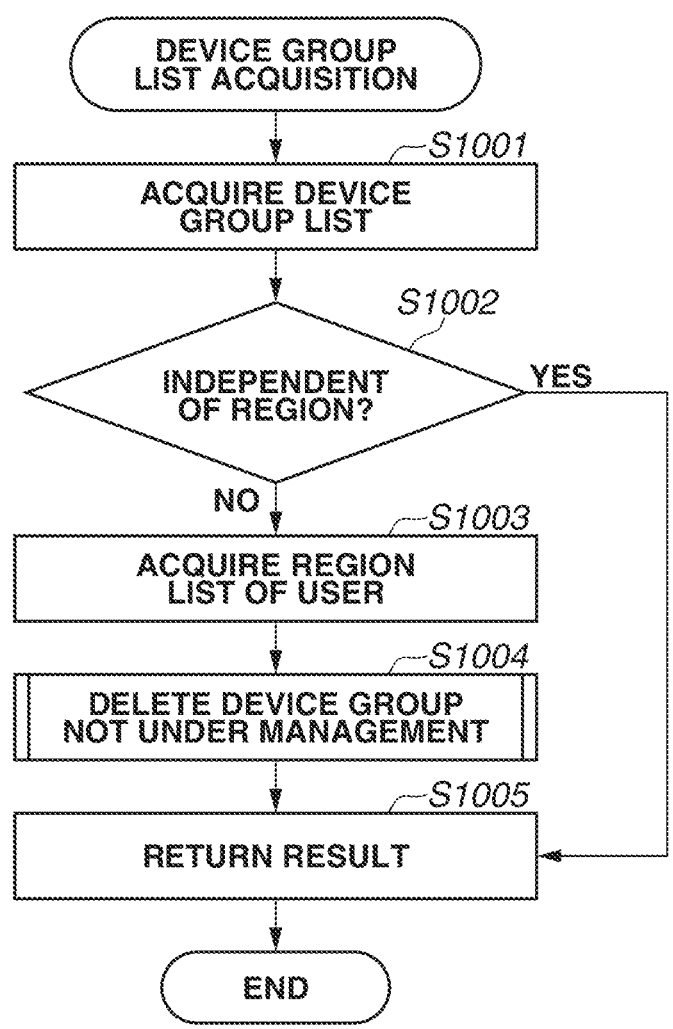

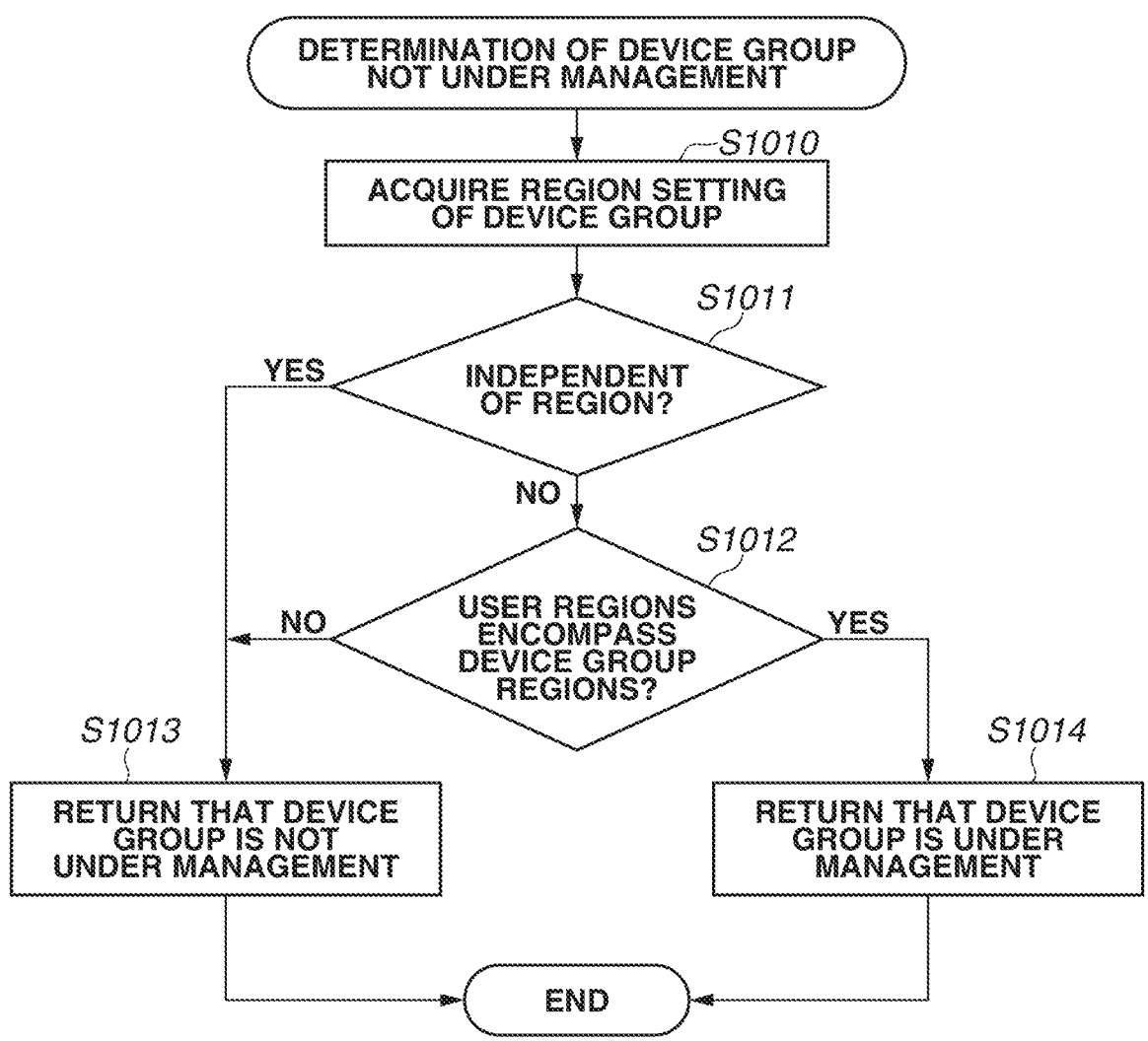

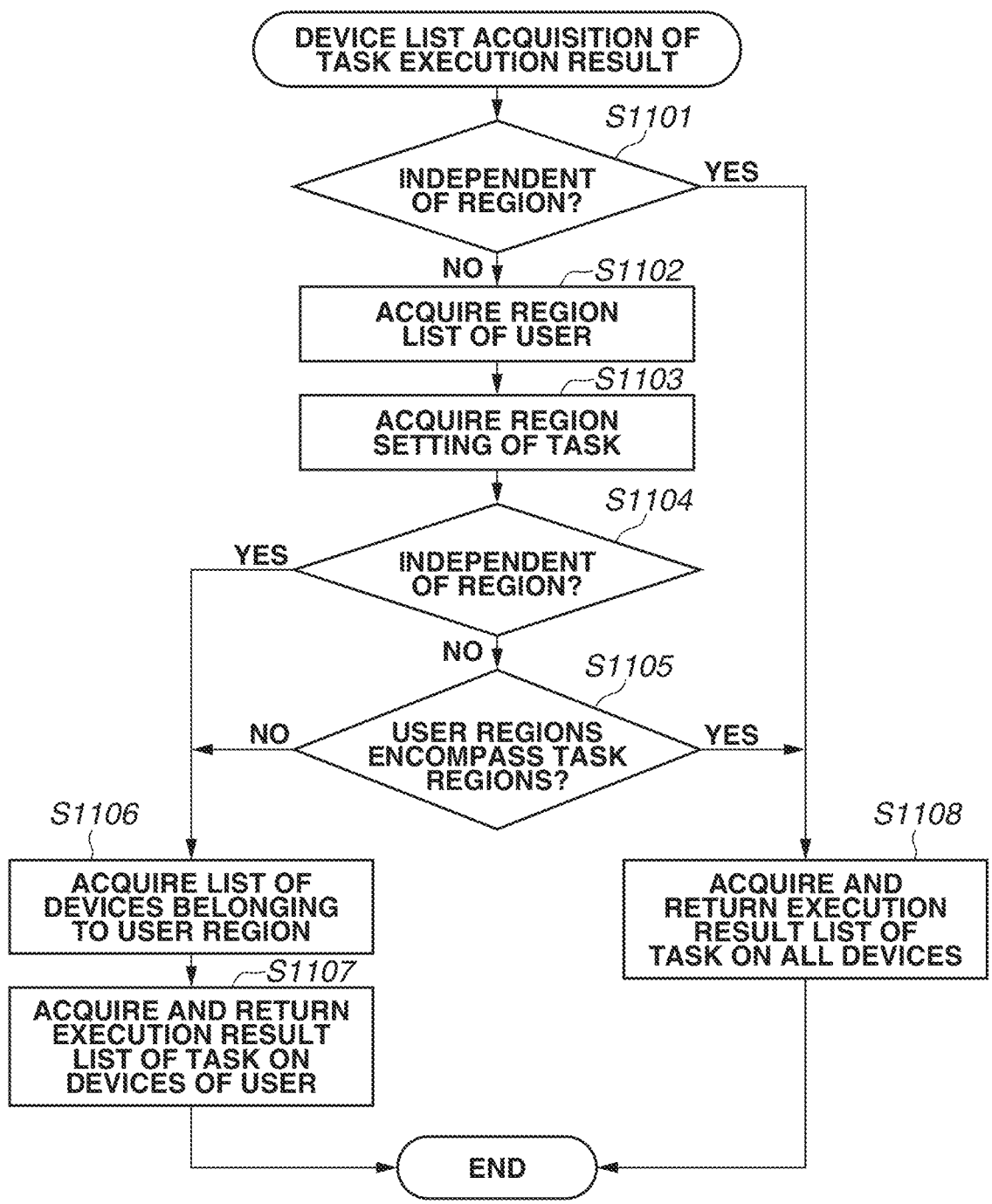

FIG.12A

```
{ "sort":{"name":"ProductName","ascending":false},
  "skip":200,
  "take":200,
  "filters":[
    {"name":"DeviceName","operation":"StartsWith","values":["H1"]}
  ]
}
```

FIG.12B

```
{ "sort":{"name":"ProductName","ascending":false},
  "skip":200,
  "take":200,
  "filters":[
    {"name":"DeviceName","operation":"StartsWith","values":["H1"]},
    {"name":"RegionId","operation":"In","values":["101","103"]},
  ]
}
```

FIG.12C

```
{ "sort":{"name":"ProductName","ascending":false},
  "skip":200,
  "take":200,
  "filters":[
    {"name":"DeviceName","operation":"StartsWith","values":["H1"]},
    {"name":"RegionId","operation":"In","values":["101"]},
  ]
}
```

DEVICE MANAGEMENT APPARATUS, CONTROL METHOD, AND NONTRANSITORY COMPUTER-READABLE STORAGE MEDIUM

BACKGROUND

Field of the Disclosure

The present disclosure relates to a device management apparatus, a control method, and a non-transitory computer-readable storage medium.

Description of the Related Art

There have been device management systems including a management apparatus that manages network-connected devices arranged at a plurality of sites.

Japanese Patent Application Laid-Open No. 2018-82329 discusses a management apparatus that uses an attribute, such as a region, to manage a monitoring apparatus monitoring a device at each site. A structure called region management has also been used for avoiding duplicate monitoring in an installation environment of a monitoring apparatus.

Japanese Patent Application Laid-Open No. 2019-175056 discusses a technique of hierarchically constructing regions, granting an access right to a user, and providing exceptional processing for permitting access to a device belonging to a region outside the hierarchy.

The prior art does not consider how region management is to be applied to a device belonging to no region or a task to be executed across regions. In the case of hierarchically constructing regions, it becomes necessary to perform a special operation for applying exceptional control to a device belonging to a region outside the hierarchy.

Thus, burden has been imposed on an administrator.

SUMMARY

According to embodiments of the present disclosure, a device management apparatus includes a first setting unit configured to set an attribute for each of a plurality of regions, a second setting unit configured to set a region to a user, a third setting unit configured to set a region to a device and a device group, a fourth setting unit configured to set a region to a task defining an operation for a management target device, and a control unit configured to control access of a user to the device, the device group, and the task in accordance with set regions.

Further features of the present disclosure will become apparent from the following description of exemplary embodiments with reference to the attached drawings.

BRIEF DESCRIPTION OF THE DRAWINGS

FIGS. 4A and 4B are diagrams each illustrating a screen for making a region setting.

FIGS. 6A and 6B are diagrams each illustrating a screen for creating or editing a device group.

FIG. 7 is a diagram illustrating a screen for creating or editing a task.

FIG. 8 is a diagram illustrating a screen for creating or editing a task.

FIG. 10A is a flowchart illustrating device group list acquisition processing. FIG. 10B is a flowchart illustrating an example of processing of determining whether to delete a device group.

FIG. 11 is a flowchart illustrating device list acquisition processing of a task execution result.

FIGS. 12A, 12B, and 12C are diagrams each illustrating an example of a filter described in a JavaScript Object Notation (JSON) format.

DESCRIPTION OF THE EMBODIMENTS

Hereinafter, exemplary embodiments of the present disclosure will be described with reference to the drawings.

Figure 1:
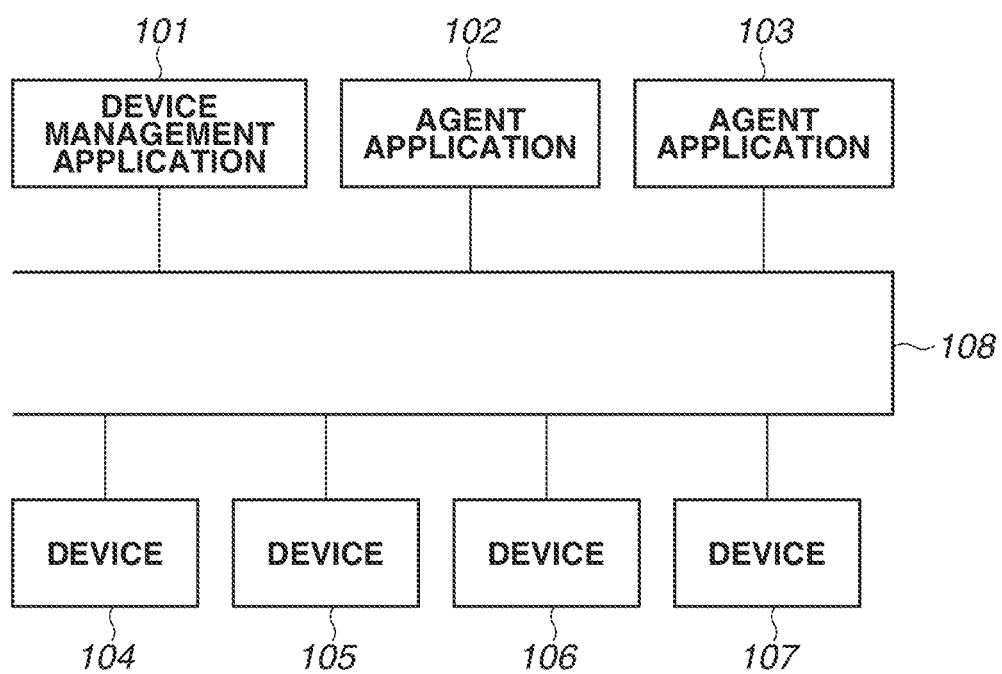
FIG. 1 is a diagram illustrating an overall configuration of a network device management system according to the present exemplary embodiment.

FIG. 1 is a diagram illustrating an example of an overall configuration of a network device management system according to an exemplary embodiment of the present disclosure.

A device management system according to a first exemplary embodiment includes a device management application 101 and a plurality of agent applications (hereinafter, will be described as "agents") 102 and 103. Such a device management system manages network devices (hereinafter, will be described as "devices") 104 to 107.

The device management application 101, the agent applications 102 and 103, and the devices 104 to 107 are connected to each other via a network 108 in such a manner that communication can be performed with each other. The device management application 101 manages devices on a network by using an attribute, such as a region. The network 108 may be a network constructed using the Internet and a local area network (LAN) in combination. The agent applications 102 and 103 and the devices 104 to 107 are associated in accordance with addresses of devices. In the present exemplary embodiment, for example, the agent application 102 is associated with the devices 104 and 105, and the agent application 103 is associated with the devices 106 and 107.

Hereinafter, the description will be given using the agent application 102 as a representative for agent applications, and the device 104 as a representative for devices. The same applies to the agent application 103, and the devices 105 and 106.

The device management application 101 instructs the agent application 102 to perform an operation on the device 104 as a task. In accordance with the instruction, the agent application 102 performs an operation of, for example, transmitting a request to the device 104 and transmitting a result of the operation to the device management application 101. Examples of the above-described operation include acquiring information from the device 104, changing a setting value of the device 104, and issuing an instruction to install an application onto the device 104.

Figure 2:
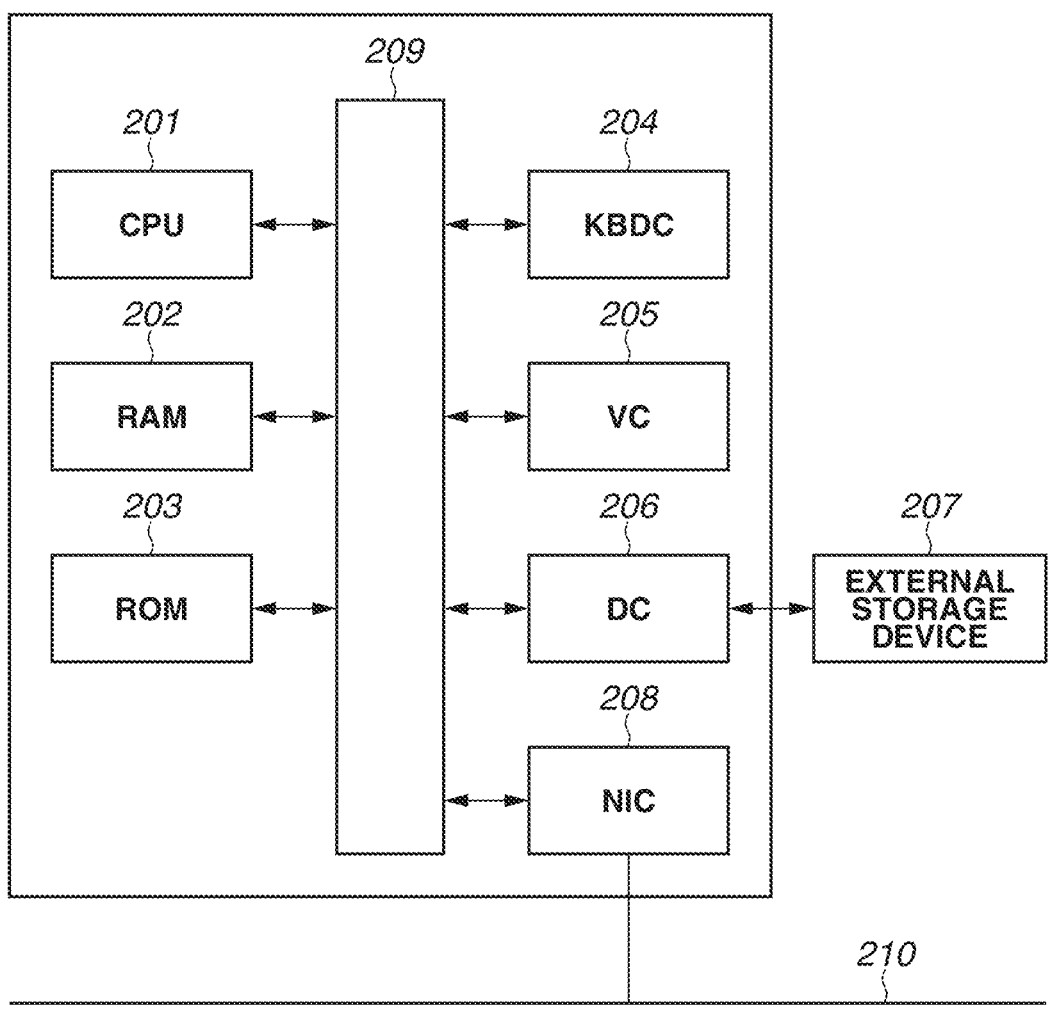
FIG. 2 is a hardware configuration diagram illustrating a host computer on which a device management application and an agent application operates.

The device management application 101 is implemented by a central processing unit (CPU) of a computer as illustrated in FIG. 2 loading a program stored in a read-only memory (ROM) an external storage device, or the like, or downloaded from a network, onto a random access memory (RAM) as necessary, and executing the program. The computer may include a plurality of computers, or may be implemented using a cloud service, for example. An apparatus on which the device management application 101 operates will be sometimes referred to as a device management apparatus.

The agent applications 102 and 103 are implemented by a CPU of a computer as illustrated in FIG. 2 loading a program stored in a ROM, an external storage device, or the like, or downloaded from a network, onto a RAM as necessary, and executing the program. An apparatus on which the agent application 102 or 103 operates will be sometimes referred to as a monitoring apparatus.

In the example illustrated in FIG. 1, the number of agent applications is two, and the number of devices is four, but the number of agent applications may be one or three or more, and the number of agent applications may be three or less or five or more. For example, also in the case of managing several tens of thousands of devices via more than a dozen agent applications, the configuration and operations are similar to those of the present exemplary embodiment.

FIG. 2 is a block diagram illustrating an example of a hardware configuration of a host computer on which the device management application 101 and the agent applications 102 and 103 operate.

As illustrated in FIG. 2, the host computer includes a CPU 201, a RAM 202, a ROM 203, and an external storage device 207. The CPU 201 comprehensively controls devices connected to a system bus 209, by loading software (program) stored in the ROM 203 or the external storage device 207, or downloaded from a network 210, onto the RAM 202 as necessary, and executing the software.

The RAM 202 functions as a main memory or a work area of the CPU 201.

The external storage device 207 includes a hard disc (HD) or a solid state drive (SSD). The external storage device 207 stores various applications including a boot program, an operating system (OS), an authentication server, and an authentication client, and various types of data, such as database data and a user file.

A keyboard controller (KBDC) 204 transmits input information from an input device (not illustrated), such as a keyboard or a pointing device to the CPU 201.

A video controller (VC) 205 controls the display on a display device including a liquid crystal display (LCD) and the like.

A disc controller (DC) 206 controls access to the external storage device 207. A network interface card (NIC) 208 is a communication controller. The host computer connects to the network 210 via the NIC 208.

Figure 3A:
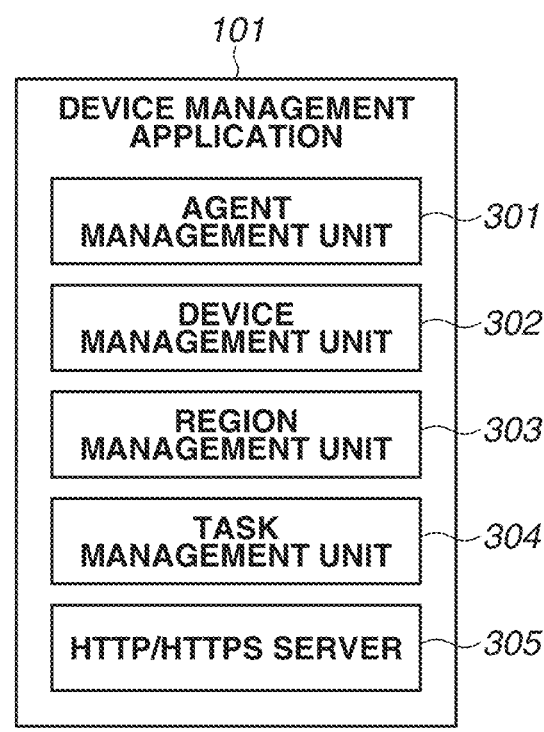
FIG. 3A is a functional configuration diagram illustrating a device management application.

FIG. 3A is a diagram illustrating an example of a functional configuration of the device management application 101.

An agent management unit 301 manages information regarding the agent applications 102 and 103.

A device management unit 302 manages information regarding the devices 104 to 107. The information regarding a device includes information regarding an agent with which the device is associated, and information regarding a region with which the device is associated.

A region management unit 303 stores information regarding a region defined by the user.

A task management unit 304 manages details and results of operations for devices, and instructs the agent application 102 to perform an operation on the device 104. These types of management information and various types of management information of device groups (not illustrated) are stored in a database (not illustrated).

A HyperText Transfer Protocol/HyperText Transfer Protocol Secure (HTTP/HTTPS) server 305 receives a request from the agent application 102 or the device 104. The HTTP/HTTPS server 305 provides a web user interface (UI) for the user operating the device management application 101.

Figure 3B:
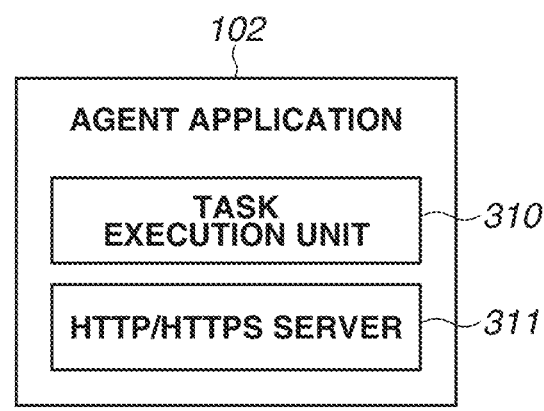
FIG. 3B is a functional configuration diagram illustrating an agent application.

FIG. 3B is a diagram illustrating an example of a functional configuration of the agent application 102.

A task execution unit 310 executes an operation on the device 104 in accordance with an instruction from the device management application 101, and then transmits a result of the execution to the device management application 101.

An HTTP/HTTPS server 311 receives a request from the device management application 101 or the device 104.

FIGS. 4A and 4B are diagrams each illustrating an example of a screen for setting a region. Screens illustrated in FIGS. 4A and 4B, and FIGS. 5 to 8, which will be described below, are provided by the HTTP/HTTPS server 305 as a web UI. More specifically, in a case where a web browser or the like of a client computer (not illustrated) issues a request to the HTTP/HTTPS server 305 in accordance with a user operation or the like, these screens are displayed on the web browser and become operable by the user.

FIG. 4A illustrates an example of a screen displaying a list of set regions.

A region list 401 indicates a list of created regions. In the example illustrated in FIG. 4A, a region name defined by the user, date and time on which a region has been lastly edited, and the number of devices belonging to a region is displayed as information regarding each region. Each device being a management target of the device management application 101 has a region. Any one of the regions displayed in the region list 401, or "unallocated" indicating that a corresponding device belongs to no region is set to each device being a management target.

A "delete" button 402 is a button for deleting a designated region. In a case where the device management application 101 detects that the user has pressed the "delete" button 402, the device management application 101 displays a dialog (not illustrated) for deletion confirmation. Then, in a case where the device management application 101 detects a deletion confirmation made by the user, the device management application 101 deletes the region from a database. Simultaneously with the deletion, the device management application 101 changes region information set to a device that has belonged to the deleted region, to "no region" (unallocated).

In a case where the device management application 101 detects that the user has clicked a row (region) in the region list 401, or pressed a "create new" button 403, the device management application 101 causes the screen to transition to a region edit screen as illustrated in FIG. 4B.

FIG. 4B illustrates an example of a screen for an advanced setting of each region.

By the user clicking a row (region) in the region list 401 in FIG. 4A, or pressing the "create new" button 403 in FIG. 4A, the region edit screen is displayed.

A field 410 is a text box for inputting a name of a region.

A field 411 is a text box for an internet protocol (IP) address range and is used for inputting a range of an IP V4 address of a device belonging to a region. The address range is input in a format of an "address" or "start address-end address". A range of the IP V4 address can be input on a plurality of rows. In a case where an input address range is not correct, the device management application 101 sets a "save" button 413 to a disabled state.

A field 412 is a text box for backward match of a Fully Qualified Domain Name (FQDN) and is used for inputting a backward match character string of an FQDN of a device belonging to a region. The backward match character string of an FQDN can be input on a plurality of rows.

In a case where the screen has transitioned to the region edit screen by the click of a row (region) in the region list 401, the device management application 101 sets values set for the clicked region, in the fields 410, 411, and 412.

In a case where the device management application 101 detects that the user has pressed a "cancel" button 414, the device management application 101 discards information input on the screen illustrated in FIG. 4B, and causes the screen to transition to the region list screen illustrated in FIG. 4A.

In a case where the device management application 101 detects that the user has pressed the "save" button 413, the device management application 101 checks whether an IP V4 address range set for a different region overlaps an address range input into the field 411 for an IP address range. In a case where the overlap has been detected, the device management application 101 displays a warning (not illustrated) indicating the overlap. On the other hand, in a case where the overlap has not been detected, the device management application 101 saves the settings input on the screen illustrated in FIG. 4B, into a database. After that, the device management application 101 creates a region of a device that satisfies the information input on the screen illustrated in FIG. 4B, or sets the information for a changed region, and causes the screen to transition to the region list screen illustrated in FIG. 4A.

In the above-described manner, an attribute can be set to each of a plurality of regions.

Then, a region is set to a device based on an attribute (IP address range, etc.) of the region set in this manner.

Figure 5:
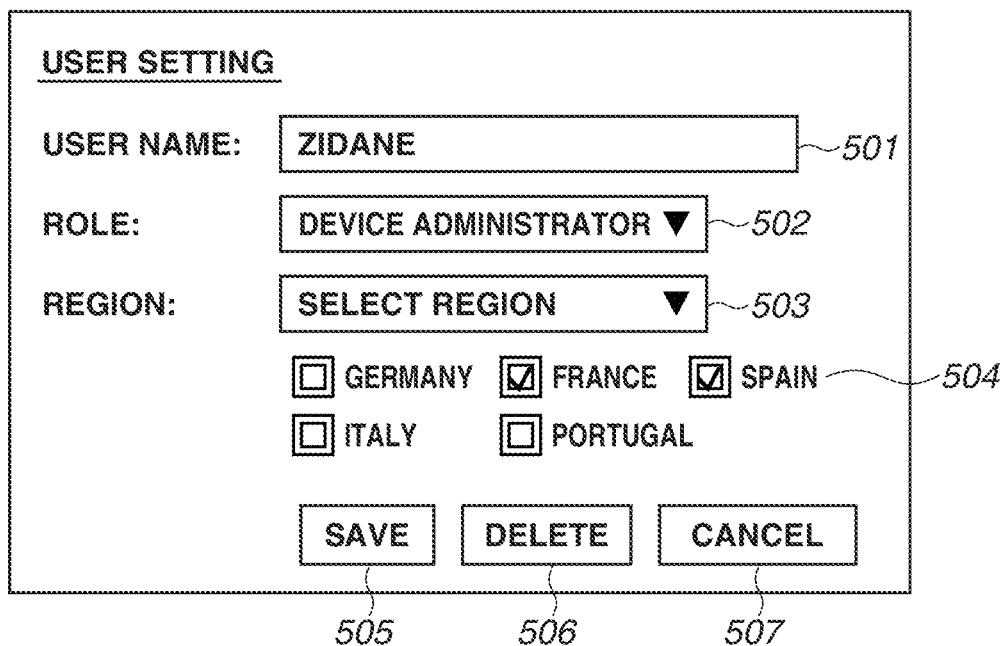
FIG. 5 is a diagram illustrating a screen for adding or editing a user.

FIG. 5 is a diagram illustrating an example of a screen for adding or editing a user of a device management application.

A field 501 is a text box for a user name and is used for inputting a user name to be used for logging into a system. A field 502 has a drop-down list for selecting a role of a user. In the field 502, a "system administrator" and a "device administrator" are selectable as roles of the user. A user having the "system administrator" role can add, edit, and delete users, and can add, edit, and delete regions. A user having the "device administrator" role cannot perform these pieces of processing.

A field 503 has a drop-down list for selecting a region setting of the user. In the field 503 for a region setting, "independent of region" and "select region" are selectable. In a case where "select region" is selected in the field 503 for the region setting, a region to which the user belongs is selected using checkboxes in a field 504. The checkboxes in the field 504 are checkboxes for selecting a region to which the user belongs. In a case where "independent of region" is selected in the field 503 for a region setting, the checkboxes in the field 504 for selecting a region becomes disabled.

In a case where a region is not set in the device management application 101, these UI components (fields 503 and 504) are not displayed. In this case, a region setting of the user becomes the same as the region setting of a case where "independent of region" is selected, which will be described below.

A user having the "system administrator" role cannot select a region setting other than "independent of region" in the field 503 for a region setting. In a case where "independent of region" is set in the field 503 for a region setting, the user can access all devices, device groups, and tasks irrespective of regions. Hereinafter, such a user will also be referred to as a user "independent of region".

In a case where "select region" is selected in the field 503 for a region setting, the user is set as a user belonging to a region checked using the checkboxes in the field 504. A user can belong to one or a plurality of regions. A user belonging to regions can access devices belonging to the regions to which the user belongs, and device groups and tasks associated with a part of the regions to which the user belongs. For example, a user set in the screen illustrated in FIG. 5 can access device groups and tasks associated with regions corresponding to "France" and "Spain", only "France", or only "Spain". The user cannot access device groups and tasks associated with regions including even at least one region to which the user does not belong, like a case where regions include "France", "Italy", and "Germany". Hereinafter, a user belonging to a region will also be referred to as a "region-designated" user.

In a case where the device management application 101 detects that the user has pressed a "save" button 505, the device management application 101 saves user information into a database in accordance with settings made on the screen.

In a case where the device management application 101 detects that the user has pressed a "delete" button 506, the device management application 101 displays a dialog for confirming the deletion of a user displayed on the screen. In a case where the device management application 101 detects a deletion confirmation made by a user, the device management application 101 deletes the displayed user from a database. The "delete" button 506 is not displayed in a case where a user is newly added.

In a case where the device management application 101 detects that the user has pressed a "cancel" button 507, the device management application 101 discards information input by the user on the screen, and the screen transitions to a user list screen (not illustrated).

In the above-described manner, a region can be set to the user.

Figure 9:
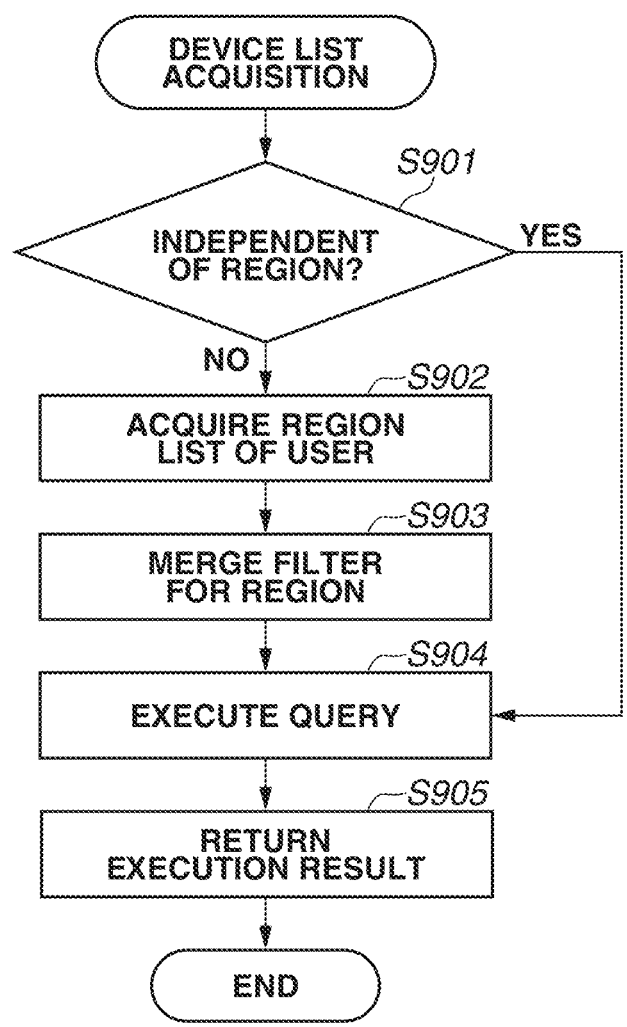
FIG. 9 is a flowchart illustrating device list acquisition processing.

FIG. 9 is a flowchart illustrating an example of processing (device list acquisition processing) to be performed when the device management application 101 acquires a list of devices manageable by the user. The processing in this flowchart is executed by the device management application 101. More specifically, the processing in this flowchart is implemented by a CPU of a computer as illustrated in FIG. 2 loading a program (the device management application 101) stored in an external storage device, onto a RAM as necessary, and executing the program. The device management application 101 starts the processing in this flowchart when acquiring a list of devices manageable by a target user (e.g., a user who has logged into the device management application 101, and is performing a predetermined operation).

A query for filtering devices to be acquired is given to the device management application 101 in the processing as an argument. FIG. 12A illustrates an example of a filter described in a JavaScript Object Notation (JSON) format.

FIGS. 12A, 12B, and 12C are diagrams each illustrating an example of a filter described in the JSON format.

The filter example illustrated in FIG. 12A means that two hundreds (200) devices each having a device name ("DeviceName") starting with ("StartsWith") "H1" are to be acquired from the 201st device of devices sorted in the descending order of "ProductName".

First of all, in step S901, the device management application 101 checks whether a target user (hereinafter, will be simply described as a "user") is "independent of region". As a result of the check, in a case where the user is "independent of region" (YES in step S901), since the user can access all devices, the device management application 101 advances the processing to step S904. In this case, in step S904, the device management application 101 executes the above-described query given to the device management application 101 as an argument, and advances the processing to step S905. In step S905, the device management application 101 returns a query execution result in step S904 described above, to an invoker, and ends the processing in this flowchart.

On the other hand, as a result of the check in step S901 described above, in a case where the user is a "region-designated" user (NO in step S901), the device management application 101 advances the processing to step S902.

In step S902, the device management application 101 acquires a list of identifiers of regions to which the user belongs. The identifier refers to a numerical value or a character string allocated by the device management application 101 to each region for identifying a corresponding region, aside from a name set by the user. For ease of explanation, a numerical value is used in this case.

Next, in step S903, the device management application 101 merges the identifiers of the regions to which the user belongs that have been acquired in step S902 described above, with the above-described query given as an argument. For example, FIG. 12B illustrates a result of the above-described merger of a case where the identifiers (numerical values) of the regions to which the user belongs are "101" and "103".

The example illustrated in FIG. 12B means that a condition that "RegionId" is included (In) in the lists "101" and "103" is further added to the query given for the processing.

After step S903 described above, the device management application 101 advances the processing to step S904. In this case, in step S904, the device management application 101 executes the query merged with the above-described filter, and advances the processing to step S905. In step S905, the device management application 101 returns a query execution result obtained in step S904 described above, to an invoker, and ends the processing in this flowchart.

For example, a description will be given of a case where a query given for the device list acquisition processing as an argument already includes a region-based filter condition as illustrated in FIG. 12C.

In the case of the example illustrated in FIG. 12C, in a merger result of the filter in step S903 described above, since "101" designated by the argument is further narrowed down by "101" and "103" indicating the regions to which the user belongs, "101" common to both conditions remains. In step S903 described above, the same filter (FIG. 12C) as the original filter is consequently generated.

Through the above-described processing, a list of devices manageable by the user can be acquired. Then, the device management application 101 can appropriately control user's access to devices in accordance with a set region using the list acquired in the above-described manner With this configuration, in a case where the user belongs to one or more regions, access to devices belonging to a region to which the user does not belong can be restricted.

FIGS. 6A and 6B are diagrams each illustrating an example of a screen for creating or editing a device group.

A device belonging to a device group is designated by individually designating a device, or designating a device designation condition. Examples of conditions to be designated include a condition that a designated character string is included in a product name of a device, and a condition that an IPv4 address of a device falls within a designated range.

FIG. 6A corresponds to an example of a screen to be displayed in a case where a device is to be individually designated.

A field 601 group name is a text box for inputting a device name.

Fields 602 and 603 for region settings are UI components for designating a region to which the device group belongs. The configurations and the display of these UI components vary depending on region information set in the device management application 101, and a region setting of the user operating the screen. In a case where a region is not set in the device management application 101, these UI components are not displayed. In this case, a region setting of a device group becomes the same as a region setting of a case where "independent of region" is selected, which will be described below.

In a case where a region setting of the operating user is "independent of region", "independent of region" and "select region" are selectable from a drop-down list in the field 602. On the other hand, in a case where a region setting of the operating user is not "independent of region", that is to say, in a case where the operating user belongs to one or more designated regions, only "select region" is selectable from the drop-down list in the field 602. In a case where "select region" is selected from the drop-down list in the field 602, checkboxes in the field 603 for region selection is enabled. In a case where the user is "independent of region", regions selectable using the checkboxes in the field 603 become all regions set in the device management application 101, and in a case where the user belongs to one or more regions, selectable regions become the regions to which the user belongs.

A table 604 is for selecting devices belonging to the device group. Devices displayed in the table 604 vary based on the selection of the region settings performed in the fields 602 and 603 of the device group. In a case where "independent of region" is selected from the drop-down list in the field 602, all devices are displayed in the table 604. In a case where "select region" is selected from the drop-down list in the field 602, devices belonging to regions selected using the checkboxes in the field 603 are displayed in the table 604.

In a case where the device management application 101 detects that the user has pressed a "save" button 605, the device management application 101 saves the content (group name, region setting, and list of selected devices) of each input into a database as information regarding a device group. Then, the device management application 101 causes the screen to transition to a device group list screen (not illustrated).

In a case where the device management application 101 detects that the user has pressed a "delete" button 606, the device management application 101 deletes the device group from a database, and causes the screen to transition to the device group list screen (not illustrated). The "delete" button 606 is not displayed when a device group is newly created.

In a case where the device management application 101 detects that the user has pressed a "cancel" button 607, the device management application 101 discards the information input on the screen, and causes the screen to transition to the device group list screen (not illustrated).

FIG. 6B corresponds to a screen example of a device selection part to be displayed in a case where devices belonging to a device group are designated by a condition. A device selection part (part of the table 604) in FIG. 6A is replaced with the content illustrated in FIG. 6B.

In a case where a device group is created by designation of a condition, the device management application 101 selects devices satisfying the condition, when devices belonging to the device group become necessary.

A field 610 has a drop-down list for selecting a filter item, and items to be designated as a filter are listed. In a case where the device management application 101 detects that the user has pressed an "add" button 611, the device management application 101 adds a filter setting of a filter selected in the field 610, to the top of a list of currently designated filter settings in fields 612 to 613.

The filter settings in the fields 612 to 613 are filter settings included in a list of currently designated filter settings. A filter setting includes a filter item, a filter operation, and a filter value.

In the case of the filter setting in the field 612, a filter item, a filter operation, and a filter value are "device name", "starts with designated value", and "HQ", respectively. In the case of the filter setting in the field 613, a filter item, a filter operation, and a filter value are "product name", "includes designated value", and "LBP", respectively. While, the two filter settings of the fields 612 and 613 are illustrated in the example illustrated in FIG. 6B, the number of filter settings may be one or three or more.

Values selectable from the above-described filter operation drop-down list vary in accordance with a type of a filter item. For example, in a case where a filter item is a character string, such as "device name" or "product name", "equal to designated value", "not equal to designated value", "starts with designated value", "ends with designated value", or "includes designated value" is selectable. In a case where a filter item is an "IP address", only "falls within designated range" is selectable. Then, an address range, such as "172.29.60.0-172.29.61.255", or a single address, such as "172.29.62.10", can be designated as a filter value.

In a case where the device management application 101 detects the click on a "x" mark at the right end of a filter setting, the device management application 101 deletes the filter setting from a list of currently designated filter settings.

In a case where the device management application 101 detects that the user has pressed an "apply" button 614, the device management application 101 displays devices satisfying the region settings in the fields 602 and 603 in FIG. 6A, and the filter settings designated in the fields 612 to 613 in FIG. 6B, in a table 616.

For example, in a case where "independent of region" is selected from the drop-down list in the field 602 in FIG. 6A, from among all devices, devices satisfying conditions of both of the filter settings in the fields 612 and 613 are displayed in the table 616. Alternatively, in a case where "select region" is selected from the drop-down list in the field 602, from among the devices belonging to the regions selected using the checkboxes in the field 603, devices satisfying conditions of both of the filter settings in the fields 612 and 613 are displayed in the table 616.

In a case where the device management application 101 detects that the user has pressed a "clear" button 615, the device management application 101 deletes all the filter settings (filter settings in the fields 612 and 613 in the example illustrated in FIG. 6B), and updates the table 616.

In a case where the device management application 101 detects that the user has pressed a "save" button 605, the device management application 101 saves the content (group name, region setting, filter setting) of each input into a database as information regarding a device group. Then, the device management application 101 causes the screen to transition to the device group list screen (not illustrated).

As for a device group which has been stored, whether the device group is selectable and editable by the user is determined in accordance with a region setting of the user. In a case where the user is "independent of region", all device groups can be selected and edited. In a case where the user belongs to one or more regions, device groups belonging to the regions to which the user belongs can be selected and edited. In other words, the user cannot select or edit a device group including at least one region to which the user does not belong, and a device group being "independent of region".

In the above-described manner, a region can be set to a device group.

FIG. 10A is a flowchart illustrating an example of processing (device group list acquisition processing) to be performed when the device management application 101 acquires a list of device groups manageable by the user. The processing illustrated in the flowcharts in FIGS. 10A and 10B is executed by the device management application 101. More specifically, the processing illustrated in the flowcharts in FIGS. 10A and 10B is implemented by a CPU of a computer as illustrated in FIG. 2 loading a program (the device management application 101) stored in an external storage device, onto a RAM as necessary, and executing the program. The device management application 101 starts the processing in this flowchart when acquiring a list of device groups manageable by a target user.

First of all, in step S1001, the device management application 101 acquires a list of device groups set in the device management application 101.

Next, in step S1002, the device management application 101 checks whether a target user (hereinafter, a "user") is "independent of region". In a case where a region setting of the user is "independent of region", this means that the user has an access right to all device groups. Thus, as a result of the check, in a case where the user is "independent of region" (YES in step S1002), the device management application 101 advances the processing to step S1005. In this case, in step S1005, the device management application 101 returns the device group list acquired in step S1001 described above, to an invoker, and ends the processing in this flowchart.

On the other hand, as a result of the check in step S1002, in a case where the user is a "region-designated" user (NO in step S1002), the device management application 101 advances the processing to step S1003.

In step S1003, the device management application 101 acquires a list of regions to which the user belongs.

Next, in step S1004, the device management application 101 deletes device groups not under management of the user from the device group list acquired in step S1001 described above, in accordance with the list of regions to which the user belongs, and a region setting of a device group. The details are illustrated in FIG. 10B.

Lastly, in step S1005, the device management application 101 returns the device group list acquired in step S1004 described above, to an invoker, and ends the processing in this flowchart.

FIG. 10B is a flowchart illustrating an example of processing for determination of whether to delete a device group, in the deletion processing of device groups not under management of the user in step S1004 of FIG. 10A.

In step S1004 of FIG. 10A, the device management application 101 deletes device groups not under management of the user from the device group list in accordance with a result of the determination processing illustrated in FIG. 10B that is performed on each device group of the device group list acquired in step S1001.

First of all, in step S1010, the device management application 101 acquires a region setting of a device group to be checked.

Next, in step S1011, the device management application 101 checks whether the region setting acquired in step S1010 described above is "independent of region". A region-designated user cannot manage a device group being "independent of region".

Thus, in a case where a region setting of a device group is "independent of region" (YES in step S1011), the device management application 101 advances the processing to step S1013. Then, in step S1013, the device management application 101 returns a result indicating that the device group is not under management, to an invoker, and ends the processing in this flowchart.

On the other hand, in a case where a region setting of a device group is region-designed (NO in step S1011), the device management application 101 advances the processing to step S1012.

In step S1012, the device management application 101 checks a containment relationship between regions to which the user belongs and regions to which a device group belongs. In a case where the regions to which the user belongs encompass the regions to which a device group belongs, the user can manage the device group. Thus, in this case (YES in step S1012), the device management application 101 advances the processing to step S1014.

In step S1014, the device management application 101 returns a result indicating that the device group is under management, to an invoker, and ends the processing in this flowchart.

On the other hand, in a case where the regions to which the user belongs do not encompass the regions to which a device group belongs (NO in step S1012), the device management application 101 advances the processing to step S1013.

In step S1013, the device management application 101 returns a result indicating that the device group is not under management, to an invoker, and ends the processing in this flowchart.

By the above-described processing, a list of device groups manageable by the user can be acquired. Then, the device management application 101 can appropriately control user's access to device groups in accordance with a set region using the list acquired in this manner. With this configuration, in a case where the user belongs to one or more regions, access to device groups belonging to a region to which the user does not belong can be restricted.

Hereinafter, screens for creating or editing a task will be described with reference to FIGS. 7 and 8.

The task refers to a set of settings for executing designated processing on a selected device. By creating a task, it becomes possible to repeatedly execute the same processing. Examples of the task include a delivery of an address book including an address of facsimile and a transmission destination of a scanned image to a digital multifunction peripheral (MFP) (device) and acquisition of the total number of sheets printed by a digital MFP after the shipment for each attribute, such as color or monochrome, and print or copy.

FIG. 7 is a diagram illustrating an example of a screen for creating or editing a task of delivering a certification authority (CA) certificate to a digital MFP. FIG. 7 illustrates, as an example, creation or editing of a task of delivering a CA certificate to a digital MFP, but the task is not limited to this. The device management application 101 can manage a state of each certificate installed on each management target device, including a CA certificate delivered to the management target device. Specifically, the device management application 101 collects information regarding an installed certificate and information, such as an expiration date and a state (valid/expired) from each of the management target devices, according to a predetermined schedule. The device management application 101 also has a function of providing information for displaying these pieces of collected information on a web browser.

In FIG. 7, a field 701 is for a character string indicating a type of a task. A task type may be made selectable and editable by the user as a drop-down list. In this example, in the case of newly creating a task, before the screen illustrated in FIG. 7 is displayed, the user has selected a task type.

A field 702 is a text box for inputting a name of a task.

Fields 703 and 704 are UI components for designating a region to which the task belongs. The configurations and display of these UI components vary in accordance with region information set in the device management application 101 and a region setting of the user operating the screen. In a case where a region is not set in the device management application 101, these UI components are not displayed. In this case, a region setting of a task becomes the same as a region setting of a case where "independent of region" is selected, which will be described below.

In a case where a region setting of a currently operating user is "independent of region", "independent of region" and "select region" are selectable from a drop-down list in the field 703. On the other hand, in a case where a region setting of the currently operating user is not "independent of region", that is to say, in a case where the currently operating user belongs to one or more designated regions, only "select region" is selectable from the drop-down list in the field 703.

In a case where "select region" is selected from the drop-down list in the field 703, checkboxes in the field 704 for region selection is enabled. In a case where the user is "independent of region", regions selectable using the checkboxes in the field 704 become all regions set in the device management application 101, and in a case where the user belongs to one or more regions, selectable regions become the regions to which the user belongs. These operations are similar to those of the region settings in the fields 602 and 603 of a device group in FIG. 6A.

Fields 705 and 706 for schedule settings are UI components for designating an execution schedule of a task. A drop-down list in the field 705 is a drop-down list for selecting a type of a schedule. Examples of types of schedules include "designate date and time", "every day", "every week", and "every month".

A part for designating execution date and time of a drop-down list in the field 706 varies in accordance with the type of a schedule selected from the drop-down list in the field 705. In a case where "designate date and time" is selected from the drop-down list in the field 705, a component for selecting date and time is displayed in the drop-down list in the field 706 as illustrated in FIG. 7. For example, in a case where "every week" is selected from the drop-down list in the field 705, a checkbox (not illustrated) for selecting a day of a week, and a component (not illustrated) for setting an execution time are displayed in the drop-down list in the field 706.

A table 707 is a table for selecting a CA certificate to be delivered by the task, from among CA certificates managed by the device management application 101.

A table 708 is a table for selecting a device to which the task delivers a CA certificate. Devices displayed in the table 708 vary in accordance with the selection of the region settings in the fields 703 and 704 of the task. For example, in a case where "independent of region" is selected from the drop-down list in the field 703, all devices are displayed in the table 708. In a case where "select region" is selected from the drop-down list in the field 703, devices belonging to the regions selected using the checkboxes in the field 704 are displayed in the table 708.

A table 709 is a table for selecting a device group to which a device to which the task delivers a CA certificate belongs. Device groups displayed in the table 709 vary in accordance with the selection of the region settings in the fields 703 and 704 of the task. For example, in a case where "independent of region" is selected from the drop-down list in the field 703, all device groups are displayed in the table 709. In a case where "select region" is selected from the drop-down list in the field 703, device groups belonging to the regions selected using the checkboxes in the field 704 are displayed. In this case, device groups being "independent of region" and device groups including a region other than the regions selected using the checkboxes in the field 704 are not displayed.

In a case where the device management application 101 detects that the user has pressed a "save" button 710, the device management application 101 saves task settings made on the screen into a database as task information, and the screen transitions to a task list screen (not illustrated). At the same time, the device management application 101 determines next execution date and time of the task in accordance with a schedule setting of the saved task, and makes a setting to execute the task on the next execution date and time.

In a case where the device management application 101 detects that the user has pressed a "delete" button 711, the device management application 101 deletes the task from the database, and the screen transitions to the task list screen (not illustrated). The "delete" button 711 is not displayed when a task is newly created.

In a case where the device management application 101 detects that the user has pressed a "cancel" button 712, the device management application 101 discards the information input on the screen, and the screen transitions to the task list screen (not illustrated).

FIG. 8 is a diagram illustrating an example of an edit screen of a task for deleting a CA certificate installed on a device. FIG. 8 illustrates, as an example, creation or editing of a task of deleting a CA certificate installed on a device, but the task is not limited to this. The redundant description will not be omitted for the same screen components as those in FIG. 7. For example, fields 801 to 806 correspond to the fields 701 to 706 in FIG. 7, and the detailed redundant description will be omitted.

A table 807 is a table for the user selecting a CA certificate to be deleted by the task. The device management application 101 manages CA certificates installed on each device, using a database. More specifically, the device management application 101 manages a list of CA certificates installed on each device, and a list of devices to which each CA certificate is installed. Normally, devices and CA certificates are in a many-to-many relationship.

Certificates displayed in the table 807 vary in accordance with a selection state of regions in the fields 803 and 804 for region settings. In a case where "independent of region" is selected from the drop-down list in the field 803, all CA certificates installed on one or more devices are displayed in the table 807. On the other hand, in a case where "select region" is selected from the drop-down list in the field 803, CA certificates installed on devices belonging to regions selected using checkboxes in the field 804 are displayed in the table 807.

In the above-described manner, a region can be set to a task defining an operation to be performed on a management target device.

The device management application 101 has a function of displaying an execution result of a task set as described above, on a screen, and a function of displaying an execution result (processing result) of a task on each device being an execution target of the task, on a screen. Hereinafter, the above-described "execution result of a task" will be referred to as an "execution result of a task itself". An "execution result of a task on each device being an execution target of the task" will be referred to as a "processing result of a task on each device being an execution target of the task". The device management application 101 performs the following control for displaying an execution result of a task itself, and a processing result of a task on each device.

1. An execution result of a task itself is displayed irrespective of a region setting of the user.

More specifically, unlike a device list and a device group list, as for an execution result of a task itself, a result of a task including a region to which the user itself does not belong is also acquired, and the result is provided by the device management application 101 to the user via a screen.

2. A processing result of a task on all devices is displayed to the user for whom "independent of region" is set in the region setting of the user in FIG. 5.

3. A processing result of a task on a device belonging to a region to which the user does not belong is not displayed to the user for whom "select region" is set in the region setting of the user in FIG. 5.

In other words, while all tasks are displayed as an "execution result of a task itself", a processing result of a task on a device belonging to a region to which the user belongs is displayed as for a "processing result of a task on each device".

For example, the device management application 101 provides, as a werb UI using the HTTP/HTTPS server 305, a screen displaying an execution result of a task itself and a screen displaying a processing result of a task on each device being an execution target of the task. More specifically, by a web browser and the like of a client computer (not illustrated) issuing a request to the HTTP/HTTPS server 305 in accordance with a user operation, these screens are displayed on the web browser to be browsed by the user.

FIG. 11 is a flowchart illustrating an example of processing (device list acquisition processing of an execution result of a task) in which the device management application 101 acquires a list of processing results of a task on each device being an execution target of the task. The processing illustrated in this flowchart is executed by the device management application 101. More specifically, the processing illustrated in this flowchart is implemented by a CPU of a computer as illustrated in FIG. 2 loading the device management application 101 stored in an external storage device, onto a RAM as necessary, and executing the device management application 101. The device management application 101 starts the processing in this flowchart when acquiring a list of processing results of a task on each device being a task execution target that can be browsed by a target user.

First of all, in step S1101, the device management application 101 checks whether a region setting of a target user (hereinafter, a "user") is set to "independent of region". As a result of the check, in a case where "independent of region" is set (YES in step S1101), the device management application 101 advances the processing to step S1108. In step S1108, the device management application 101 acquires a list of processing results (execution results) of a task on each of all devices being an execution target of the task, returns the list to an invoker, and ends the processing.

On the other hand, as a result of the check, in a case where "independent of region" is not set (NO in step S1101), the device management application 101 advances the processing to step S1102.

In step S1102, the device management application 101 acquires a list of regions to which the user belongs.

Next, in step S1103, the device management application 101 acquires a region setting of a task.

Next, in step S1104, the device management application 101 checks whether the region setting of the task that has been acquired in step S1103 described above is set to "independent of region". In a case where the region setting of the task is set to "independent of region" (YES in step S1104), processing results of a task are to be limited to processing results of the task on a device belonging to a region to which the user belongs. Thus, in this case (YES in step S1104), the device management application 101 advances the processing to step S1106.

In step S1106, the device management application 101 acquires a list of devices belonging to a region to which the user belongs.

After that, in step S1107, the device management application 101 acquires processing results of the task on execution target devices included in the devices acquired in step S1106 described above, from among processing results of the task on each of all devices being an execution target of the task. Furthermore, the device management application 101 returns the acquired processing results to an invoker as a list of processing results (execution results) of the task on devices, and ends the processing.

On the other hand, in a case where the region setting of the task is set to "region-designated" (NO in step S1104), the device management application 101 advances the processing to step S1105.

In step S1105, the device management application 101 checks a containment relationship between regions to which the user belongs and regions to which the task belongs. As a result of the check, in a case where the regions to which the user belongs encompass the regions to which the task belongs (YES in step S1105), the device management application 101 advances the processing to step S1108. Because the processing in step S1108 is similar to the processing described above, the redundant description will be omitted.

On the other hand, in a case where the regions to which the user belongs do not encompass the regions to which the task belongs (NO in step S1105), the device management application 101 advances the processing to step S1106. Because the processing in subsequent steps is similar to the processing described above, the redundant description will be omitted.

By the above-described processing, a list of processing results (execution results) of a task on each device that can be browsed by the user can be acquired. Then, the device management application 101 can appropriately control user's access to tasks in accordance with a set region using the list acquired in this manner With this configuration, in a case where the user belongs to one or more regions, access to tasks belonging to a region to which the user does not belong can be restricted.

In a digital MFP, a scanned image can be transmitted to various addresses using functions, such as facsimile, an electronic mail, and a file transfer protocol (FTP).

In a second exemplary embodiment, a function of managing addresses to be delivered to a device will be described. In the case of delivering addresses to a device, in some cases, a plurality of address tables having different use applications or purposes are prepared, and addresses to be delivered to a device are managed based on a combination of these, instead of managing a single address table including many addresses.

For example, address tables such as "sales department client company facsimile number", "personnel department client company facsimile number", "nationwide sales office facsimile number", "head office e-mail address", and "sales department e-mail address" are created. Then, an address table obtained by combining "sales department client company facsimile number", "nationwide sales office facsimile number" and "sales department e-mail address" is delivered to a device installed in a sales department. An address table obtained by combining "personnel department client company facsimile number", "nationwide sales office facsimile number" and "head office e-mail address" is delivered to a device installed in a head office.

For achieving this, addresses to be delivered to a device are managed by creating "address tables" each including one or more addresses, and an "address table set" obtained by combining one or more address tables, and associating the "address table set" and the device.

The device management application 101 prohibits the user for whom "select region" is set in the region setting of the user in FIG. 5, from performing the following operations.

1. Change and deletion of a combination of address table sets associated with a device belonging to a region to which the user does not belong.

2. Deletion of an address table included in an address table set associated with a device belonging to a region to which the user does not belong.

3. Association of an address table set with a region to which the user does not belong.

By the above-described control, the device management application 101 can appropriately control user's access to address tables and address table sets in accordance with a set region.

In the above-described task, applications and setting values can also be delivered to a device selected from among management target devices, in addition to the delivery of address books (exemplified in the second exemplary embodiment), and the delivery of certificates (exemplified in the first exemplary embodiment). More specifically, in the above-described task, it is defined that at least any operation of delivery of an address book, delivery of a certificate, delivery of an application, and delivery of a setting value is executed to a device selected from among management target devices. In the above-described task, it may also be defined that an operation other than delivery (shutdown, reboot, predetermined operation (e.g., maintenance operation), instructions of other operations, etc.) is executed to a device selected from among management target devices.

As described above, according to each exemplary embodiment, devices belonging to no region are provided, and an attribute (independent of region) not restricted by region management is provided for a management target (the user, device group, task, etc.). With this configuration, it becomes possible to operate a device belonging to no region, similarly to a device belonging to a region. A plurality of regions is associated with a managed object (user, device group, task), and access control suitable for a containment relationship of the associated regions is performed. With this configuration, it becomes possible to provide an access control function that is based on a region-free combination.

For example, in a large-scale environment including a plurality of sites, an administrator of devices exists for each site. A device management application according to the present exemplary embodiment performs control in such a manner that a device administrator cannot operate devices in sites other than a site for which the device administrator is responsible, by managing devices on a network by an attribute, such as a region.

The following description will be given using Europe. The device management application performs control to prohibit a device administrator of Germany to perform device management (setting change, monitoring, etc.) of Spain. The device management application performs control to allow an administrator of Europe to perform device management of devices in Germany and devices in Spain. The device management application performs control to allow an administrator of a company-wide integrated management department to perform device management of all devices.

With the above-described configuration, it is possible to appropriately control user's access to devices, device groups, and tasks in accordance with a set region. Thus, in a large-scale network-connected device management application, devices belonging to no region, and tasks executed across regions can also be appropriately managed.

The configurations and the content of the above-described various types of data are not limited to these. Needless to say, the data can include various configurations and content in accordance with use applications and purposes.

While the exemplary embodiments have been described, but the present disclosure can be applied to an exemplary embodiment as a system, an apparatus, a method, a program, or a storage medium, for example. Specifically, the present disclosure may be applied to a system including a plurality of device, or may be applied to an apparatus including one device.

The present disclosure also encompasses all configurations obtained by combining the above-described exemplary embodiments.

Other Exemplary Embodiments

An exemplary embodiment of the disclosure can also be implemented by processing of supplying a program for executing one or more functions of the above-described exemplary embodiment, to a system or an apparatus via a network or a storage medium, and one or more processors of a computer of the system or the apparatus reads and executes the program. An exemplary embodiment of the present disclosure can also be implemented by a circuit (e.g., an application specific integrated circuit (ASIC)) executing one or more functions.

The present disclosure may be applied to a system including a plurality of device, or may be applied to an apparatus including one device.

The present disclosure is not limited to the above-described exemplary embodiments. Various modifications (including organic combinations of exemplary embodiments) can be made based on the gist of the present disclosure, and these modifications fall within the scope of the present disclosure. In other words, configurations obtained by combining the above-described exemplary embodiments and their modifications are all encompassed in the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-200942, filed Dec. 3, 2020, which is hereby incorporated by reference herein in its entirety.

What is claimed is:

1. A device management apparatus comprising:
at least one memory storing instructions; and
at least one processor executing the instructions causing the device management apparatus to:
set a first setting regarding an attribute for each of a plurality of regions;
set a second setting regarding one or more regions to respective users, wherein, as the second setting, either an individual setting for selecting one or more regions or a predetermined setting can be set;
set a third setting regarding a region to a device;
set a fourth setting regarding one or more regions to a task defining one or more target devices, wherein the task further defines a delivery processing or a deleting processing of a certification authority (CA) certificate and an operation for the one or more target devices;

provide, to a first user to whom the individual setting is set in the second setting, processing results of the task for respective one or more target devices belonging to one or more regions corresponding to a selection of the individual setting, wherein a processing result for a target device that belongs to a region which is not selected by the individual setting and to which the first user does not belong is not provided to the first user; and provide, to a second user to whom the predetermined setting is set in the second setting, the processing results for each of all target devices of the task irrespective of regions of respective target devices.

2. The device management apparatus according to claim 1, wherein, in the second setting, belonging to no region can be set to a user, and wherein restriction of access to the one or more target devices is not executed on a user belonging to no region.

3. The device management apparatus according to claim 1, wherein, in the first setting, an attribute of a region is set using information including a range of an internet protocol (IP) address, and wherein, in the third setting, a region is set to a device based on an IP address of a device and a range of an IP address that is included in the attribute of the region.

4. The device management apparatus according to claim 1, wherein, as the second setting, one or more regions are set to respective users with an administrator role, and wherein, based on the one or more regions set to the first user with the administrator role, the processing result for the target device is provided to the first user.

5. The device management apparatus according to claim 1, wherein the instructions further cause the device management apparatus to provide an execution result of the task itself to any user regardless of the second setting.

6. The device management apparatus according to claim 1, wherein the one or more target devices for the task are selected from devices belonging to the one or more regions of the task.

7. A control method for device management, the control method comprising:

setting a first setting regarding an attribute for each of a plurality of regions;

setting a second setting regarding one or more regions to respective users, wherein, as the second setting, either an individual setting for selecting one or more regions or a predetermined setting can be set;

setting a third setting regarding a region to a device;

setting a fourth setting regarding one or more regions to a task defining one or more target devices, wherein the task further defines a delivery processing or a deleting processing of a certification authority (CA) certificate and an operation for the one or more target devices;

providing, to a first user to whom the individual setting is set in the second setting, processing results of the task for respective one or more target devices belonging to one or more regions corresponding to a selection of the individual setting, wherein a processing result for a target device that belongs to a region which is not selected by the individual setting and to which the first user does not belong is not provided to the first user; and providing, to a second user to whom the predetermined setting is set in the second setting, the processing results for each of all target devices of the task irrespective of regions of respective target devices.

8. A non-transitory computer-readable storage medium storing a computer program for causing a computer to execute a control method for device management, the control method comprising:

setting a first setting regarding an attribute for each of a plurality of regions;

setting a second setting regarding one or more regions to respective users, wherein, as the second setting, either an individual setting for selecting one or more regions or a predetermined setting can be set;

setting a third setting regarding a region to a device;

setting a fourth setting regarding one or more regions to a task defining one or more target devices, wherein the task further defines a delivery processing or a deleting processing of a certification authority (CA) certificate and an operation for the one or more target devices;

providing, to a first user to whom the individual setting is set in the second setting, processing results of the task for respective one or more target devices belonging to one or more regions corresponding to a selection of the individual setting, wherein a processing result for a target device that belongs to a region which is not selected by the individual setting and to which the first user does not belong is not provided to the first user; and providing, to a second user to whom the predetermined setting is set in the second setting, the processing results for each of all target devices of the task irrespective of regions of respective target devices.

* * * * *